US011914367B2

(12) United States Patent
Creusot (10) Patent No.: US 11,914,367 B2
(45) Date of Patent: Feb. 27, 2024

(54) SUN-AWARE ROUTING AND CONTROLS OF AN AUTONOMOUS VEHICLE

(71) Applicant: GM GLOBAL TECHNOLOGY OPERATIONS LLC, Detroit, MI (US)

(72) Inventor: Clement Creusot, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 361 days.

(21) Appl. No.: 16/216,176

(22) Filed: Dec. 11, 2018

(65) Prior Publication Data

US 2020/0183386 A1 Jun. 11, 2020

(51) Int. Cl.
*G05D 1/00* (2006.01)
*G05D 1/02* (2020.01)
(Continued)

(52) U.S. Cl.
CPC ....... *G05D 1/0088* (2013.01); *G01C 21/3461* (2013.01); *G05D 1/0214* (2013.01);
(Continued)

(58) Field of Classification Search
CPC .. G05D 1/0088; G05D 1/0214; G05D 1/0246; G05D 2201/0213; G01C 21/3461; G06V 20/584
See application file for complete search history.

(56) References Cited

U.S. PATENT DOCUMENTS 9,279,693 B2    3/2016   Hymel et al.
9,816,827 B1    11/2017  Slusar
(Continued)

FOREIGN PATENT DOCUMENTS

EP   2629056 A1 *   8/2013  ......... G01C 21/3461
JP   2017207340 A *  11/2017
(Continued)

OTHER PUBLICATIONS

English Translation: Naito, JP 2017207340 A, Nov. 24, 2017, Japanese Patent Office Patent Application Publication (Year: 2017).*

*Primary Examiner* — Nadeem Odeh
(74) *Attorney, Agent, or Firm* — Calfee, Halter & Griswold LLP (57) ABSTRACT

Sun-aware routing and controls of an autonomous vehicle is described herein. A location and an orientation of a sensor system is identified within an environment of the autonomous vehicle to determine whether the sun causes a threshold level of perception degradation to the sensor system incident to generating a sensor signal indicative of a traffic light. The determination is based upon perception degradation data that can be precomputed for locations and orientations within the environment for dates and times of day. The perception degradation data is based upon the location of at least one traffic light and positions of the sun relative to the locations and the orientations within the environment. A mechanical system of the autonomous vehicle is controlled to execute a maneuver that reduces perception degradation to the sensor system when the perception degradation is determined to exceed the threshold level of perception degradation.

20 Claims, 8 Drawing Sheets

(51) Int. Cl.
  *G01C 21/34* (2006.01)
  *G06V 20/58* (2022.01)
(52) U.S. Cl.
  CPC ......... *G05D 1/0246* (2013.01); *G06V 20/584* (2022.01); *G05D 2201/0213* (2013.01)

(56) References Cited

U.S. PATENT DOCUMENTS

| | | |
|---|---|---|
| 10,083,606 B2 | 9/2018 | Krunic et al. |
| 10,126,136 B2 | 11/2018 | Iagnemma |
| 2014/0022539 A1* | 1/2014 | France .................... G01S 19/48 356/139.1 |
| 2018/0009441 A1 | 1/2018 | Valois |
| 2018/0053415 A1* | 2/2018 | Krunic ................. G08G 1/0145 |
| 2018/0091717 A1* | 3/2018 | Ion ...................... H04N 5/2351 |
| 2018/0164107 A1* | 6/2018 | Yalla .................. G01C 21/3461 |
| 2019/0186931 A1* | 6/2019 | Dittmer ............. G06K 9/00791 |
| 2020/0290440 A1* | 9/2020 | Ma ......................... G06V 10/25 |
| 2021/0263522 A1* | 8/2021 | Udagawa ............ H04N 5/2351 |

FOREIGN PATENT DOCUMENTS

| | | | |
|---|---|---|---|
| WO | 2010040386 A1 | 4/2010 | |
| WO | WO-2020105123 A1 * | 5/2020 | ........... A01B 69/001 |

* cited by examiner

SUN-AWARE ROUTING AND CONTROLS OF AN AUTONOMOUS VEHICLE

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. For instance, the camera sensor system may output sensor signals including image data representative of an environment in which the autonomous vehicle is located. The image data may include a series of images generated from a perspective of the camera sensor system. The image data can be provided to a computing system in communication with the camera sensor system to identify objects in proximity to the autonomous vehicle, such as traffic lights. A mechanical system of the autonomous vehicle such as a vehicle propulsion system, a braking system, or a steering system can be controlled, at least in part, based on the image data generated by the camera sensor system.

Contrary to detection of physical objects which can be represented by a plurality of sensor systems including, but not limited to, the camera sensor system, the lidar sensor system, the radar sensor system, etc., detecting an illuminated configuration of a traffic light is particularly suited for the camera sensor system. The camera sensor system may sample a field of view at a predetermined sampling rate (e.g., 10 hertz) so that when the illuminated configuration of the traffic light changes, such as from a red light to a green light, the mechanical systems of the autonomous vehicle can be manipulated in accordance with the state of the traffic light.

Accordingly, the autonomous vehicle can operate, in part, by detecting, based upon the image data included in the sensor signal, a color and a shape of an activated traffic light bulb. Problematically for camera sensor systems is that when the sun is disposed at a location where a same camera frame includes both the traffic light and the sun, the backlight emitted from the sun may cause the computing system to misperceive the illuminated configuration of the traffic light. In other instances, the backlight from the sun may be directed toward the camera sensor system with such intensity that the illuminated configuration of the traffic light is unperceivable by the computing system. In either case, the computing system may erroneously instruct the autonomous vehicle to perform a maneuver that does not conform with a present configuration of the traffic light. Thus, in instances where perception degradation to the sensor system can compromise the navigational integrity of the autonomous vehicle, additional safeguards may be desirable.

SUMMARY

The following is a brief summary of subject matter that is described in greater detail herein. This summary is not intended to be limiting as to the scope of the claims.

Described herein are various technologies pertaining to sun-aware routing and controls of an autonomous vehicle. With more specificity, described herein is a computing system that identifies locations where backlight from the sun causes perception degradation to a camera sensor system of an autonomous vehicle. With still more specificity, described herein is an autonomous vehicle including a mechanical system, a sensor system configured to generate a sensor signal indicative of a traffic light, and a computing system in communication with the mechanical system and the sensor system. The computing system is configured to identify a location and orientation of the sensor system within an environment of the autonomous vehicle and determine whether the sun causes a threshold level of perception degradation to the sensor system at the location and orientation of the sensor system when the sensor system generates the sensor signal indicative of the traffic light. The determination is based upon a date, a time of day, the location of the sensor system, and the orientation of the sensor system. A mechanical system of the autonomous vehicle is controlled to execute a maneuver that reduces perception degradation to the sensor system when the perception degradation to the sensor system is determined to exceed the threshold level of perception degradation.

The maneuver executed by the autonomous vehicle can include at least one of adjusting the location of the sensor system, manipulating the orientation of the sensor system, navigating the autonomous vehicle along an alternative route, or changing a setting of the sensor system (e.g., adjusting an aperture or shutter speed). The maneuver can preempt the perception degradation to the sensor system determined to exceed the threshold level of perception degradation, for example, by projecting the location of the sensor system into the environment based upon location information stored in a data store of the computing system and/or information incorporated in a high definition (HD) map. Alternatively, the maneuver can be a reactive maneuver to the threshold level of perception degradation being exceeded, for example, by manipulating the location and/or orientation of the camera sensor system when the computing system detects that sunlight is overexposing the camera sensor system incident to detecting a traffic light.

According to an example, when implementing a preemptive technique, a routing system of the autonomous vehicle can avoid generating a route through locations where the sun is projected to overexpose the camera sensor system of the autonomous vehicle incident to detecting the traffic light. The sun is known to follow a trajectory that can be tracked according to analemma or other similar models. Thus, the position of the sun can be identified for a particular location and orientation of the sensor system within the environment for a given date and a given time of day. Pursuant to an illustration, the time of day can be determined according to an offset from a meridian and the date can be determined according to an offset from a first day of a calendar year.

Determining whether the sun causes a threshold level of perception degradation to the sensor system when the sensor system generates the sensor signal indicative of the traffic light can be further based upon at least one of an object that occludes the sun from the location of the sensor system, a current weather condition, or weather forecast information. For example, if weather conditions are identified at the location of the sensor system which include overcast skies, execution of a maneuver may not be required to reduce perception degradation. Additionally, location information for an object that occludes the position of the sun (e.g., buildings, overpasses, signage, vegetation, etc.) may be included in the data store and/or the HD map accessible to the autonomous vehicle, wherein an alignment between the sun, the object that occludes the position of the sun, and the sensor system can generate a shadow that alleviates overexposure of sunlight to the camera sensor system that would otherwise prompt a maneuver by the autonomous vehicle.

According to another example, when implementing a reactive technique, the computing system of the autonomous vehicle can identify a sensor signal generated by the camera sensor system indicative of a traffic light and the sun, wherein the sun causes a threshold level of perception degradation to the sensor system. For instance, perception degradation to the sensor system may be based upon a proximity of a first pixel corresponding to the sun to a second pixel corresponding to the traffic light, wherein the first pixel and the second pixel are included in an image represented in the sensor signal. Perception degradation data can be identified based upon the signal indicative of the traffic light and the sun, wherein the perception degradation data includes a location of the sensor system, an orientation of the sensor system, a date, and a time of day. The perception degradation data is stored in the data store of the computing system, wherein the perception degradation data provides a basis for controlling the mechanical system to execute the maneuver that reduces perception degradation to the sensor system.

In an embodiment, the computing system can be incorporated in the autonomous vehicle. More specifically, the perception degradation to the sensor system can be determined to exceed the threshold level of perception degradation based upon a value computed by the computing system incorporated in the autonomous vehicle. In another embodiment, the computing system can be disposed remotely to the autonomous vehicle, wherein a signal identifying perception degradation at the locations and orientations of the sensor system is communicated to the autonomous vehicle to determine whether a maneuver should be executed. The perception degradation to the sensor system determined to exceed the threshold level of perception degradation by the remote computing system can be based upon precomputed values for the locations and orientations of the sensor system, wherein the precomputed value is identified by the computing system incorporated in the autonomous vehicle according to the date and the time of day. That is, the locations and orientations of the sensor system may be projected by the computing system to determine perception degradation along an identified route.

The computing system that provides the perception degradation data to the autonomous vehicle to facilitate the maneuver that reduces perception degradation to the sensor system can include a data store comprising location information, wherein locations and orientations within the environment as well as a location of at least one traffic light are identified from the location information. The computing system determines positions of the sun relative to the locations and the orientations within the environment for dates and times of day and generates perception degradation data for the locations and the orientations within the environment based upon the location of the at least one traffic light and the positions of the sun relative to the locations and the orientations within the environment for the dates and the times of day. The perception degradation data is stored in the data store of the computing system, wherein perception degradation data specifies a level of interference caused by the sun with detection of a state of a traffic light by a sensor system at a particular location and a particular orientation within the environment for a given date and a given time of day.

The locations and orientations within the environment are based upon at least one of a latitude value, a longitude value, or an elevation value. The positions of the sun are identified based upon azimuth and altitude sets having respective origins at the locations and orientations within the environment. The computing system converts the positions of the sun to local reference coordinates by a first transform. That is, since the sun is at different positions in the sky at a same date and time of day when observed from different reference points on the earth, the first transform identifies a geometric position of the sun with respect to the local reference coordinates. The computing system likewise identifies a position of a chassis of the autonomous vehicle based upon the local reference coordinates by a second transform. The computing system further identifies the location of the sensor system based upon the position of the chassis by a third transform. The third transform is a static transform based upon a fixed position of the sensor system with respect to the chassis. Thus, the locations and orientations within the environment correspond to a projected or actual location of the sensor system.

In addition, the perception degradation data can define a precomputed lane score that identifies a weight for at least one portion of a route. Lane scores can be precomputed and defined at a plurality of points along a plurality of lanes incorporated in the HD map, so that a plurality of routes can be weighted by the routing system to generate a sun-aware route for the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to sun-aware routing and controls of an autonomous vehicle is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

Figure 1:
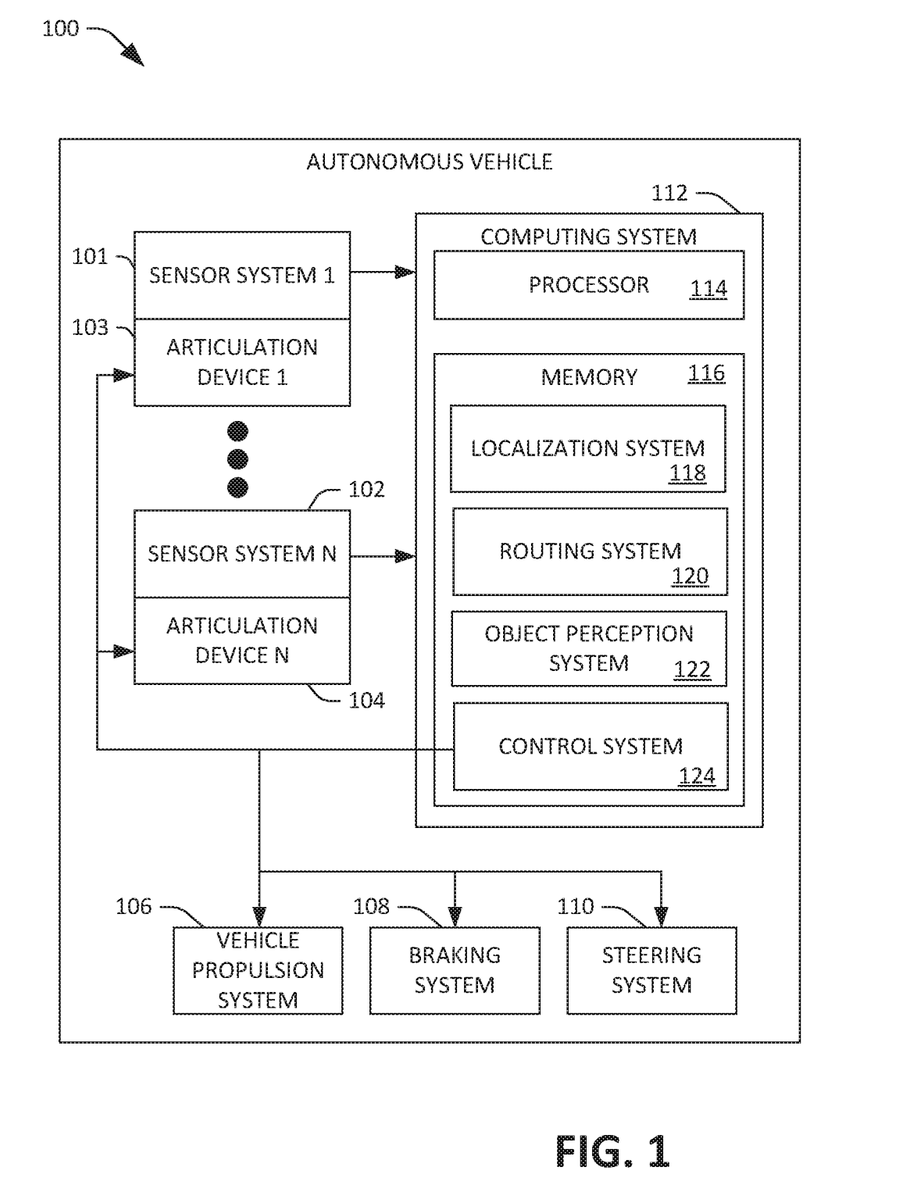
FIG. 1 illustrates an exemplary autonomous vehicle.

With reference now to FIG. 1, an exemplary autonomous vehicle 100 is illustrated. The autonomous vehicle 100 can navigate about roadways without a human driver based upon sensor signals output by sensor systems 101-102 of the autonomous vehicle 100. The autonomous vehicle 100 includes a plurality of sensor systems 101-102 (a first sensor system 101 through an Nth sensor system 102). The sensor systems 101-102 are of different types and are arranged about the autonomous vehicle 100. For example, the first sensor system 101 may be a camera sensor system and the Nth sensor system 102 may be a lidar sensor system. Other exemplary sensor systems include, but are not limited to, radar sensor systems, global positioning system (GPS) sensor systems, inertial measurement units (IMU), infrared sensor systems, laser sensor systems, sonar sensor systems, and the like. The sensor systems 101-102 can include one or more camera sensor systems, such as a fixed exposure camera or an autoexposure camera.

As set forth below, the sensor system 1 101 can refer to a camera sensor system. According to an example, a sensor signal generated by the camera sensor system (e.g., the sensor system 1 101) may be indicative of a current state of a traffic light.

Furthermore, some or all of the of sensor systems 101-102 may be articulated by one or more articulation devices (e.g., a first articulation device 103 through an Nth articulation device 104). Articulating sensors are sensors that may be oriented/rotated by the one or more articulation devices 103-104 such that a field of view of the articulating sensors may be directed towards different regions surrounding the autonomous vehicle 100. The articulation devices 103-104 can be electro-mechanical devices or members to which the sensor systems 101-102 may be affixed. It is to be appreciated, however, that the claimed subject matter is not limited to each of the sensor systems 101-102 being articulated; for instance, at least a subset of the sensor systems 101-102 can be stationary.

The autonomous vehicle 100 further includes several mechanical systems that can be used to effectuate appropriate motion of the autonomous vehicle 100. For instance, the mechanical systems can include but are not limited to, a vehicle propulsion system 106, a braking system 108, and a steering system 110. The vehicle propulsion system 106 may include an electric motor, an internal combustion engine, or both. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100 during propulsion.

The autonomous vehicle 100 additionally comprises a computing system 112 that is in communication with the sensor systems 101-102 and is further in communication with the articulation devices 103-104, the vehicle propulsion system 106, the braking system 108, and the steering system 110. The computing system 112 includes a processor 114 and memory 116 that stores instructions that are executed by the processor 114.

The memory 116 comprises a plurality of systems that cooperate to provide sun-aware routing and controls for the autonomous vehicle 100. A localization system 118 can identify a location and orientation of the autonomous vehicle 100 in three-dimensional space and, more specifically, the location and orientation of the sensor system 1 101 (e.g., the camera sensor system) within an environment of the autonomous vehicle 100. The location of the sensor system 1 101 can be based upon at least one of a latitude value, a longitude value, or an elevation value. The localization system 118 can likewise determine the orientation of the sensor system 1 101 at the location of the sensor system 1 101, wherein the orientation of the sensor system 1 101 may correspond to an orientation/direction of the autonomous vehicle 100.

The object perception system 122 determines whether the sun causes a threshold level of perception degradation to the sensor system 1 101 when the sensor system 1 101 generates a sensor signal indicative of the traffic light, wherein the determination by the object perception system 122 is based upon a date, a time of day, the location of the sensor system 1 101, and the orientation of the sensor system 1 101. In an exemplary embodiment, the time of day can be determined according to an offset from a meridian and the date can be determined according to an offset from a first day of a calendar year. The object perception system 122 may determine the perception degradation to the sensor system 1 101 based upon a precomputed value for the location of the sensor system 1 101, wherein the precomputed value is identified according to the date and the time of day. For instance, the object perception system 122 may determine perception degradation based upon a table of precomputed values including numerous locations and orientations in the environment that correspond to a plurality of dates and times of day at the locations and orientations in the environment. Alternatively, the object perception system 122 may determine the perception degradation to the sensor system 1 101 according to a value computed by the object perception system 122 incorporated in the computing system 112. For instance, perception degradation to the sensor system 1 101 may be computed based upon a proximity of a first pixel corresponding to the sun to a second pixel corresponding to a traffic light, wherein the first pixel and the second pixel are included in an image represented in the sensor signal.

The routing system 120 generates a route for the autonomous vehicle 100 from a source location to a target location based upon a perception degradation signal received from the object perception system 122. For instance, the locations and orientations for the sensor system 1 101 can be projected for an identified route on a given date at a given time of day to determine the locations and orientations along the identified route where perception degradation to the sensor system 1 101 will exceed the threshold level of perception degradation. The route generated by the routing system 120 can be further based upon information, such as objects that occlude the sun from the location of the sensor system 1 101 (e.g., a building), a current weather condition, or weather forecast information, to determine whether the sun causes a threshold level of perception degradation to the sensor system 1 101 when the sensor system 1 101 generates a sensor signal indicative of a traffic light. That is, the routing system 120 may generate routes based upon shadows from nearby objects or whether conditions that block the sun from otherwise causing the threshold level of perception degradation. Additionally, the routing system 120 can identify a maneuver to reposition the sensor system 1 101 in a location and/or orientation along the identified route that mitigates perception degradation to the sensor system 1 101.

The control system 124 is configured to control the mechanical systems of the autonomous vehicle 100 (e.g., the vehicle propulsion system 106, the brake system 108, and/or the steering system 110) based upon an output from the routing system 120. Specifically, the mechanical systems can be controlled by the control system 124 to execute a maneuver that reduces perception degradation to the sensor system 1 101 when the perception degradation to the sensor system 1 101 is determined to exceed the threshold level of perception degradation by the object perception system 122. For instance, the routing system 120 can cause the autonomous vehicle 100 to navigate along an alternative route, change lanes, stop at different locations (e.g., to enable a traffic light to be viewed without interference from the sun), or the like. The control system 124 may control the mechanical systems to execute a maneuver that preempts perception degradation to the sensor system 1 101 determined to exceed the threshold level of perception degradation as well as maneuvers that are responsive to detection of the threshold level of perception degradation being exceeded. Additionally or alternatively, the control system 124 can be configured to control the articulation device 1 103 based upon the output from the object perception system 122. The foregoing examples can enable the location of the sensor system 1 101 to be controlled and/or the orientation of the sensor system 1 101 to be manipulated. Further, a setting of the sensor system 1 101 (e.g., adjusting an aperture or shutter speed) can be controlled based upon the output from the object perception system 122.

Figure 2:
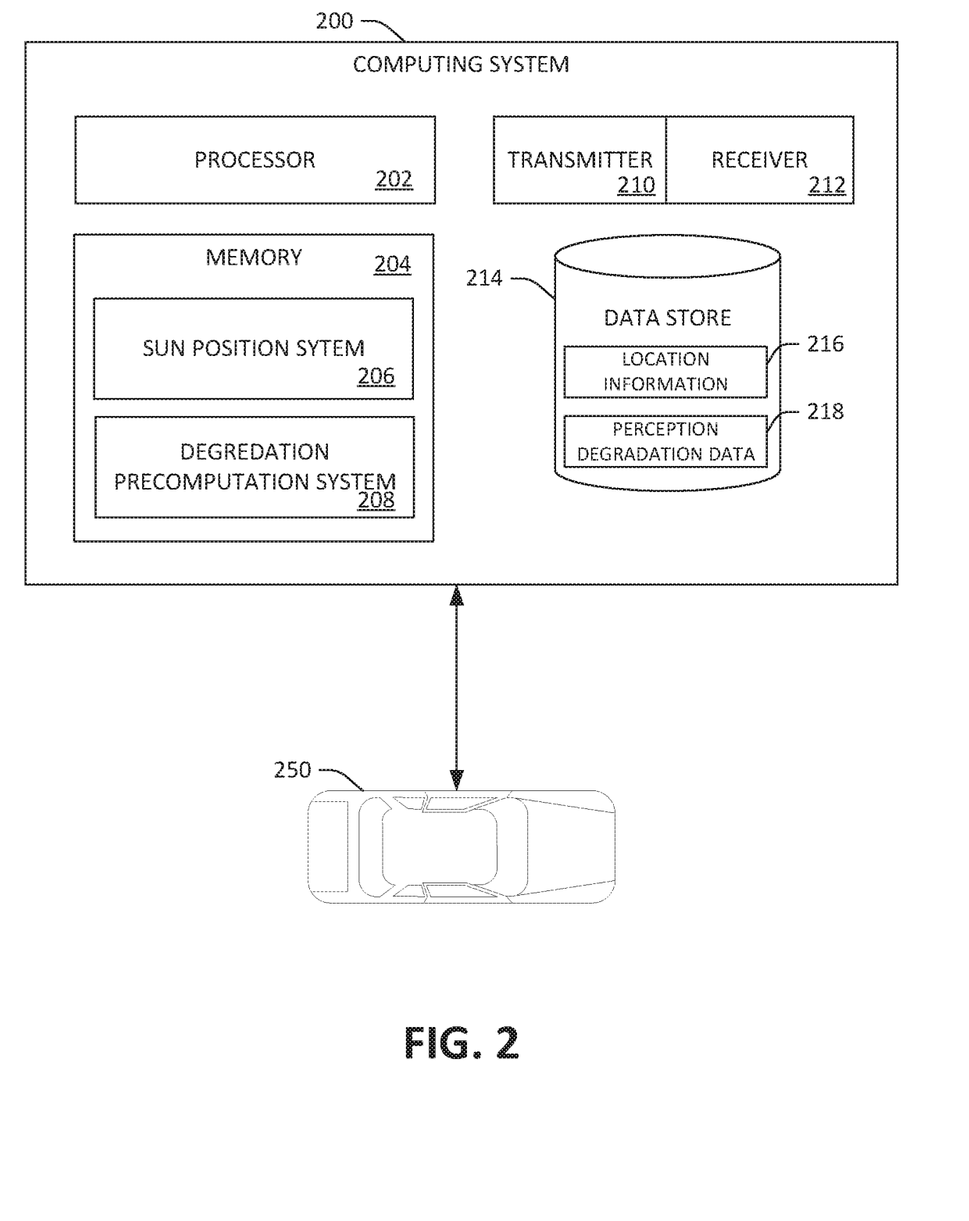
FIG. 2 illustrates an exemplary computing system in communication with an autonomous vehicle.

With reference now to FIG. 2, an exemplary computing system 200 configured to generate perception degradation data 218 for a sensor system (e.g., the sensor system 1 101, the camera sensor system) of an autonomous vehicle 250 (e.g., the autonomous vehicle 100) is illustrated. The computing system 200 can be disposed remotely to or within the autonomous vehicle 250, which may be the autonomous vehicle 100, and comprises a processor 202 and memory 204 that stores computer-executable instructions that are executed by the processor 202 to cause the processor 202 to perform acts in accordance with the instructions.

The computing system 200 further includes a data store 214 that comprises location information 216. The location information 216 may be based upon data points that correspond to objects or locations within an HD map. The HD map may similarly be included in the data store 214. The location information 216 can identify geographic locations and orientations of traffic lights as well as locations and orientations of general points within an environment of the autonomous vehicle 250, wherein the general points correspond to an array of locations and orientations within the environment, such as an environment like a city or other geographic area identified by the HD map. Further, the locations and orientations with the environment may correspond to at least one location and orientation of the sensor system of the autonomous vehicle 250.

A sun position system 206 is configured to determine positions of the sun relative to the locations and orientations within the environment for dates and times of day, wherein the locations and orientations within the environment may be based upon at least one of a latitude value, a longitude value, or an elevation value. The positions of the sun are identified at the locations and orientations by the sun position system 206 based upon azimuth and altitude sets, wherein the azimuth and altitude sets have respective origins at the locations and orientations within the environment. Thus, a position of the sun can be identified for a date and a time of day from a location and orientation that corresponds to the sensor system of the autonomous vehicle 250.

A degradation precomputation system 208 generates perception degradation data 218 for the locations and the orientations within the environment, wherein the perception degradation data 218 specifies a level of interference caused by the sun with detection of a state of a traffic light by a sensor system at a particular location and a particular orientation within the environment for a given date and a given time of day. The degradation precomputation system 208 identifies locations and orientations within the environment from the location information 216 included in the data store 214. In addition, the degradation precomputation system 208 identifies a location of at least one traffic light from the location information 216 included in the data store 214. An output from the sun position system 206 that identifies positions of the sun relative to the locations and the orientations within the environment for the dates and the times of day is provided to the degradation precomputation system 208 to generate perception degradation data 218 for the locations and orientations within the environment based upon the location of the at least one traffic light. The time of day can be determined according to an offset from a meridian and the date can be determined according to an offset from a first day of a calendar year.

Perception degradation data 218 generated by the degradation precomputation system 208 is stored in the data store 218. The perception degradation data 218 can define a precomputed lane score that identifies a weight for at least one portion of a route navigated by the autonomous vehicle 250 based upon the positions of the sun relative to a location of the sensor system of the autonomous vehicle 250. While routes are oftentimes generated according to metrics such as minimizing length, cost, and/or travel time of the route, certain weights applied to these metrics can be adjusted based upon the perception degradation data 218. Adjustments in weights to a generated route or portions thereof based upon perception degradation data 218 can be similar to adjustments in weights applied to routes generated during times of the day where heavy traffic is expected.

The perception degradation data 218 generated for the locations and orientations within the environment can be further based upon at least one of a weather condition or an object that occludes the sun from the locations and orientations within the environment. For example, the degradation precomputation system 208 may determine that a route having a particular location and orientation does not exceed a threshold level of perception degradation when current weather conditions for the location and orientation are identified as cloudy. However, if weather conditions are changed to sunny, the degradation precomputation system 208 may determine that the threshold level of perception degradation would be exceeded.

A transmitter 210 and a receiver 212, which may be configured as a transceiver, are disposed in the exemplary computing system 200 to establish communication with the autonomous vehicle 250. For example, the receiver 214 is configured to receive signals from external devices, such as signals indicative of location information 216 for the data store 214, whereas the transmitter 210 is configured to transmit precomputed perception degradation data 218 to the autonomous vehicle 250. The precomputed perception degradation data 218 can be generated by identifying positions of the sun relative to locations and orientations of the camera sensor system of the autonomous vehicle 250 and converting the positions of the sun to local reference coordinates by a first transform, wherein a position of a chassis of the autonomous vehicle 250 relative to the positions of the sun can be identified based upon the local reference coordinates by a second transform, and the locations and orientations of the camera sensor system of the autonomous vehicle 250 can be identified relative to the position of the chassis of the autonomous vehicle 250 by a third transform.

Figure 3:
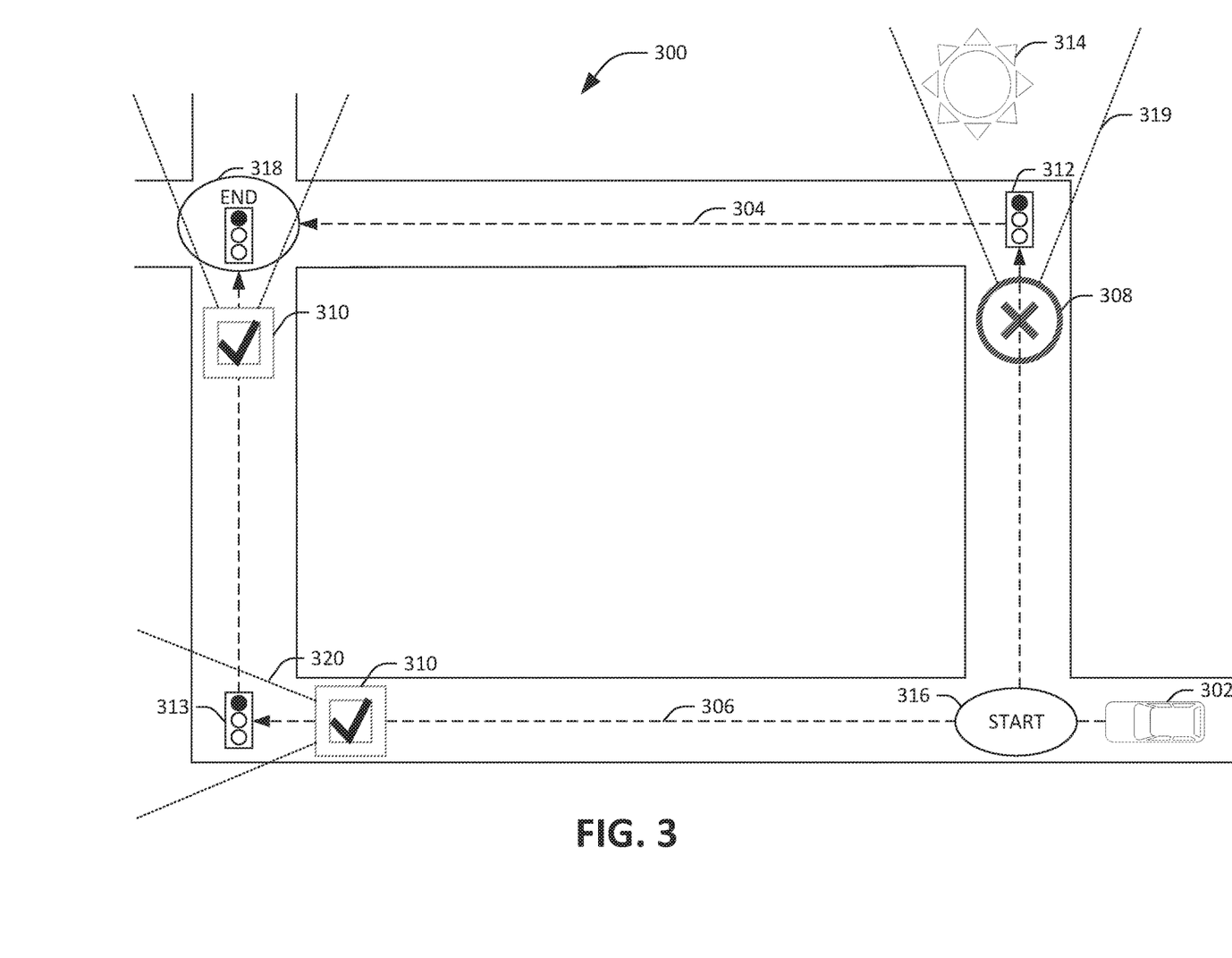
FIG. 3 illustrates an exemplary overhead view of an environment in which an autonomous vehicle utilizes sun-aware routing and controls.

With reference now to FIG. 3, an exemplary overhead view of an environment 300 is illustrated in which an autonomous vehicle 302 (e.g., the autonomous vehicle 100, the autonomous vehicle 250) utilizes sun-aware routing and controls. A routing system (e.g., the routing system 120) of the autonomous vehicle 302 can generate an initial route 304 from a source location 316 to a target location 318 based upon certain desirable metrics (e.g., length, cost, travel time, etc.). A position of the sun 314 can be identified at one or more stopping points for each traffic light disposed along the initial route 304 to determine whether a traffic light 312 and the sun 314 will be simultaneously disposed in a field of view 319 of a camera sensor system. Specifically, the orientation and the width of the field of view 319 of the camera sensor system can be compared at the location of the one or more stopping points to the location for the traffic light 312 and the position of the sun 314 on a date and a time of day when the autonomous vehicle 302 is expected to arrive at the location for the one or more stopping points. If the traffic light 312 and the sun 314 are within the field of view 319 at the location for the one or more stopping points, a temporary avoidance location 308 is identified at the one or more stopping points, thereby causing an alternative route 306 to be generated from the source location 316 to the target location 318.

The position of the sun 314 is then identified at one or more stopping points for each traffic light disposed along the alternative route 306 to determine whether a traffic light 313 and the sun 314 will be simultaneously disposed in a field of view 320 of the camera sensor system. Specifically, the orientation and the width of the field of view 320 of the camera sensor system can be compared at the location for the one or more stopping points to the location for the traffic light 313 and the position of the sun 314 on a date and a time of day when the autonomous vehicle 302 is expected to arrive at the coordinates for the one or more stopping points. If at least one of the traffic light 313 or the sun 314 is excluded from the field of view 320 at the location for the one or more stopping points, an authorization area 310 is identified at the one or more stopping points. An authorization area 310 is an area where a traffic light 313 and the sun 314 are not projected to be simultaneously identified by the camera sensor system, based upon an orientation and field of view 320 of the camera sensor system. This process is repeated for each traffic light along a generated route until an alternative route 306 is identified with no temporary avoidance locations 308.

Figure 4:
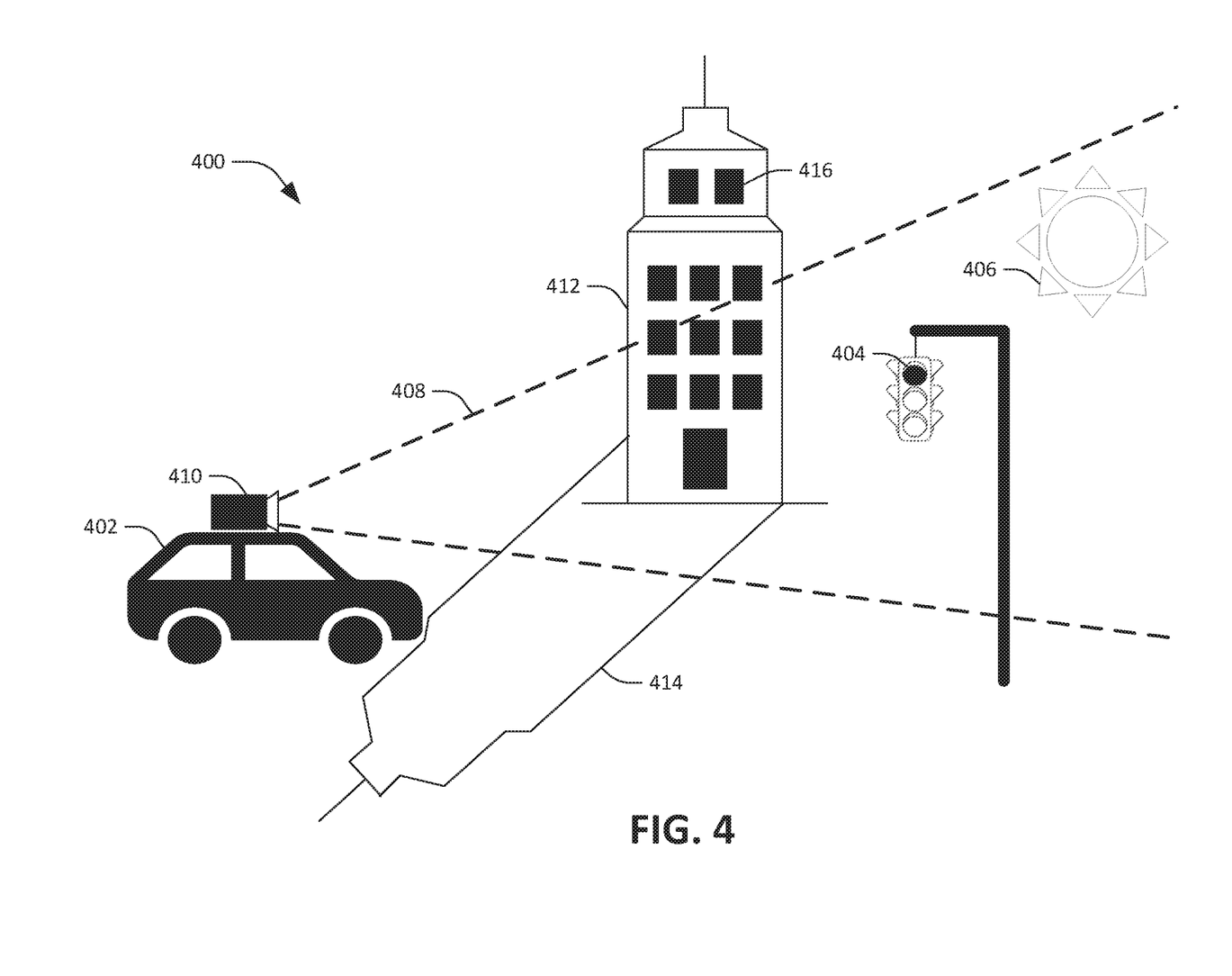
FIG. 4 illustrates an exemplary environment in which an autonomous vehicle executes a maneuver to reduce perception degradation to a sensor system.

With reference now to FIG. 4, an exemplary environment 400 is illustrated in which an autonomous vehicle 402 executes a maneuver to reduce perception degradation to a camera sensor system 410. The camera sensor system 410 simultaneously detects a traffic light 404 and the sun 406 in a same field of view 408. Accordingly, reactive routing and controls are initiated by the autonomous vehicle 402 to improve perception degradation to the camera sensor system 410. Mechanical systems of the autonomous vehicle 402 are in communication with a computing system that identifies nearby objects incorporated in an HD map of the area around the autonomous vehicle 402. Based upon the position of the sun 406, the computing system can determine that a building 412 casts a shadow 414 that passes through the field of view 408. Thus, the autonomous vehicle 402 can be maneuvered to position the camera sensor system 410 in the shadow 414 of the building 412 to improve perception degradation. The computing system can likewise determine locations where the sun 406 generates reflections that cause perception degradation to the camera sensor system 410. For instance, sunlight may reflect off a window 416 of the building 412 toward the camera sensor system 410 requiring articulation of the camera sensor system 410 and/or maneuvering of the autonomous vehicle 402 to exclude detection of the reflection.

Figure 5:
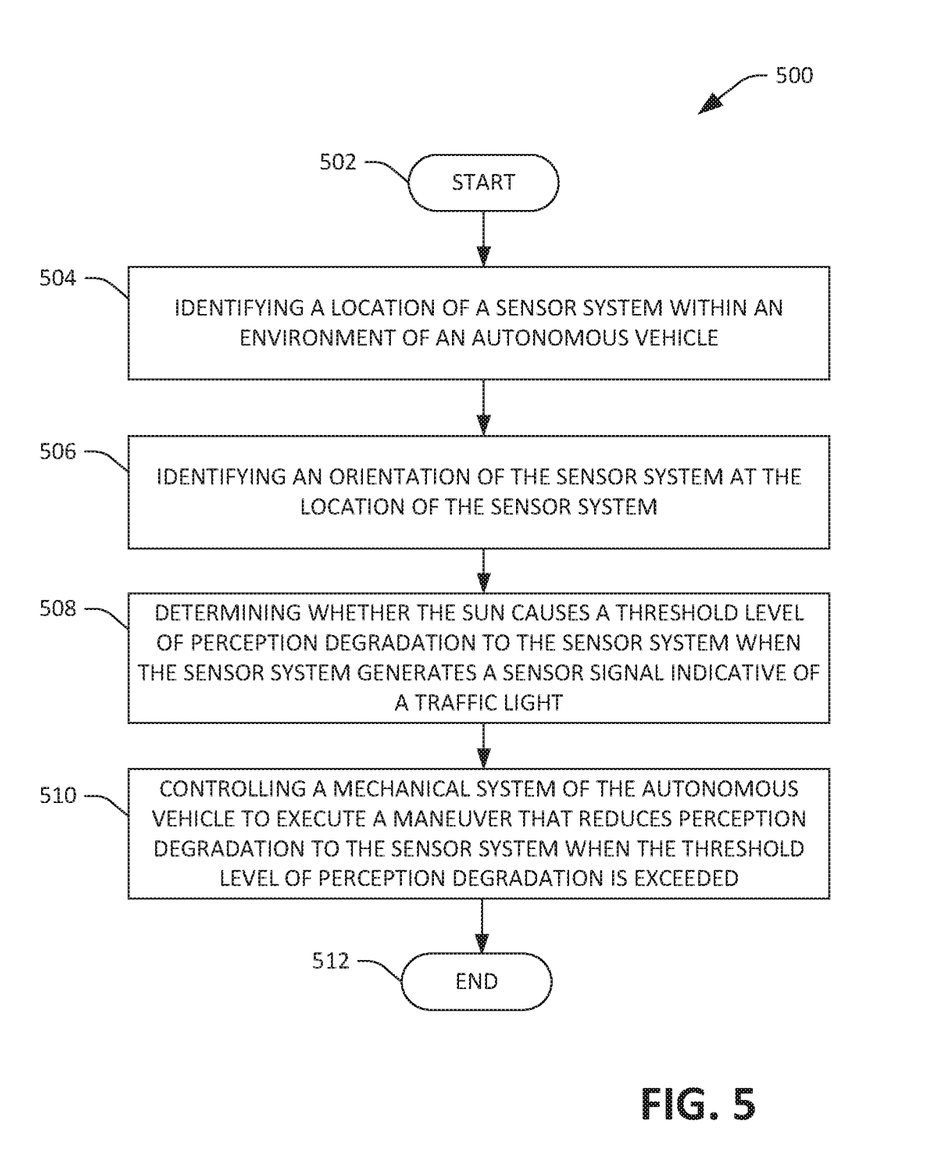
FIG. 5 is a flow diagram illustrating an exemplary methodology for reducing perception degradation to a sensor system of an autonomous vehicle.
Figure 6:
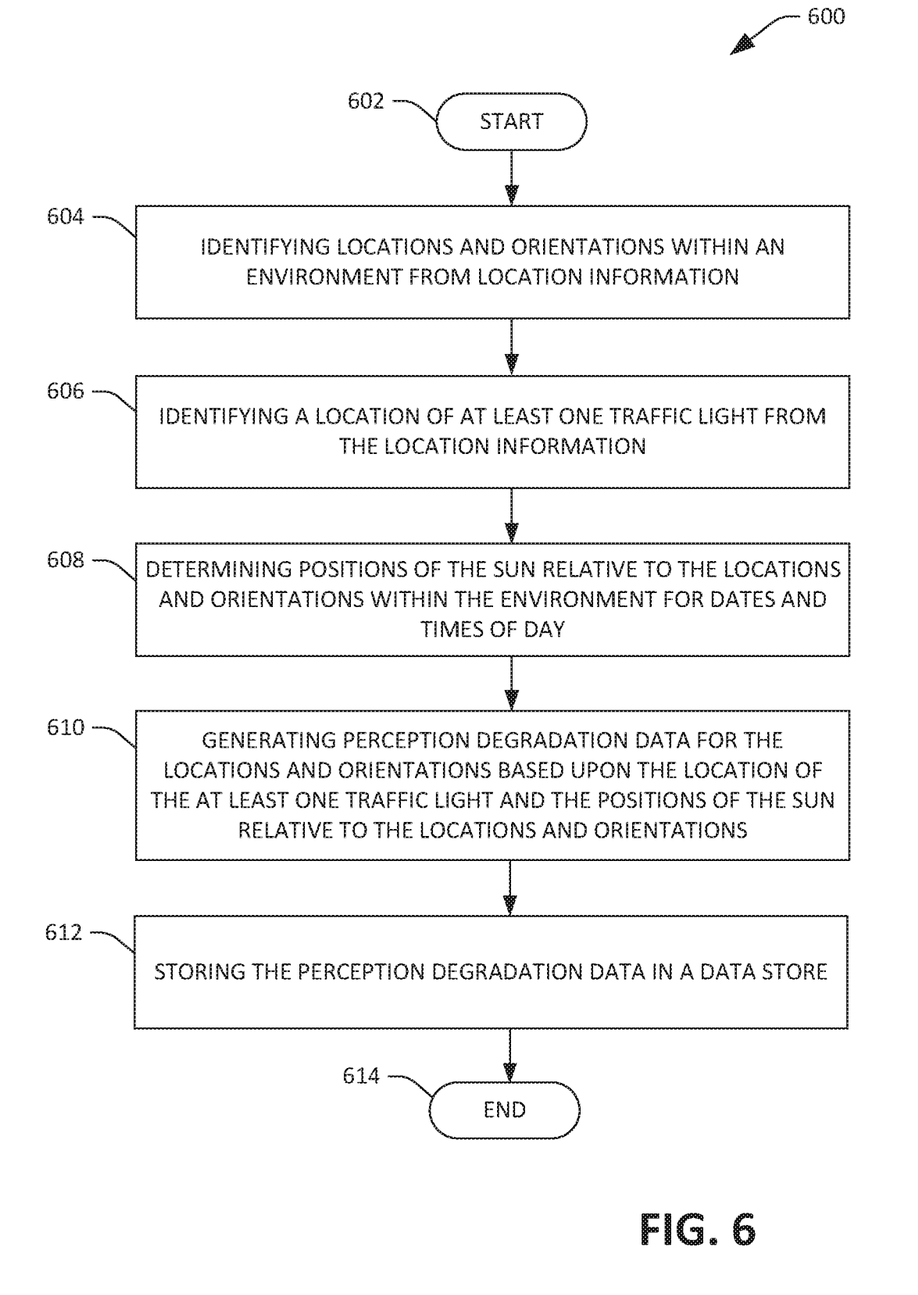
FIG. 6 is a flow diagram illustrating an exemplary methodology for generating perception degradation data based upon positions of the sun.

FIGS. 5 and 6 illustrate exemplary methodologies for sun-aware routing and controls to increase perception performance. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for reducing perception degradation to a sensor system of an autonomous vehicle is illustrated. The methodology 500 starts at 502, and at 504 a location of the sensor system is identified within an environment of an autonomous vehicle. The location of the sensor system may include a projected location of the sensor system or a current location of the sensor system. At 506, an orientation of the sensor system at the location of the sensor system is identified within the environment of the autonomous vehicle. The orientation of the sensor system may include a projected orientation of the sensor system or a current orientation of the sensor system. At 508, a determination is made regarding whether the sun causes a threshold level of perception degradation to the sensor system when the sensor system generates a sensor signal indicative of the traffic light. The determination is based upon a date, a time of day, the location of the sensor system, and the orientation of the sensor system. At 510, a mechanical system of the autonomous vehicle is controlled to execute a maneuver that reduces perception degradation to the sensor system when the perception degradation to the sensor system is determined to exceed the threshold level of perception degradation. The methodology 500 completes at 512.

Referring now to FIG. 6, an exemplary methodology 600 for generating perception degradation data based upon positions of the sun is illustrated. The methodology 600 starts at 602, and at 604 locations and orientations are identified within an environment from location information. At 606, a location of at least one traffic light is identified from the location information. At 608, positions of the sun are determined relative to the locations and orientations within the environment for dates and times of day. At 610, perception degradation data is generated for the locations and the orientations within the environment based upon the location of the at least one traffic light and the positions of the sun relative to the locations and the orientations within the environment for the dates and the times of day. Perception degradation data specifies a level of interference caused by the sun with detection of a state of a traffic light by a sensor system at a particular location and a particular orientation within the environment for a given date and a given time of day. At 612, the perception degradation data is stored in a data store. The methodology 600 completes at 614.

Figure 7:
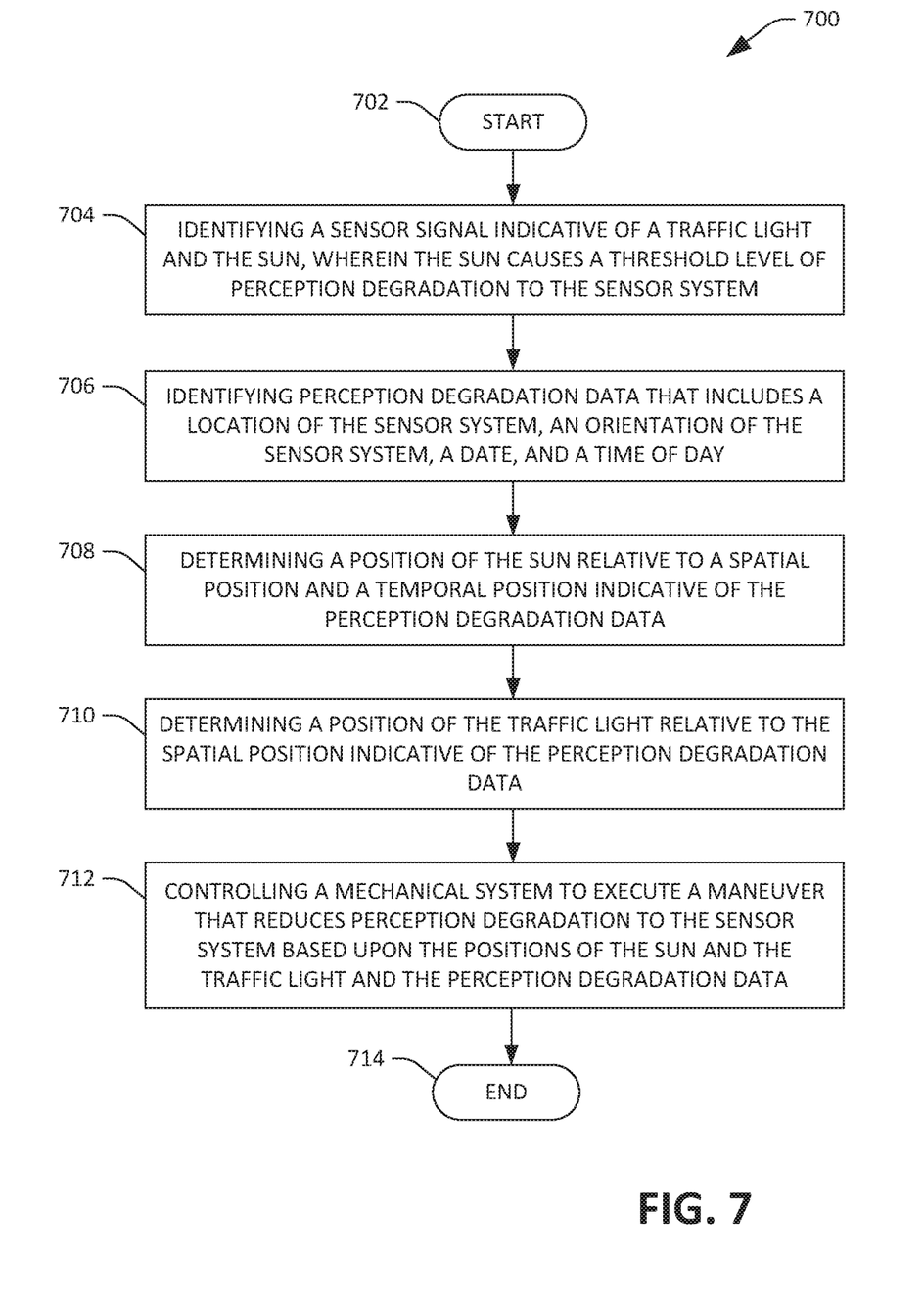
FIG. 7 is a flow diagram illustrating an exemplary methodology for reducing perception degradation to a sensor system based upon perception degradation data.

Referring now to FIG. 7, an exemplary methodology 700 for reducing perception degradation to a sensor system based upon generated perception degradation data is illustrated. The methodology 700 starts at 702, and at 704 a sensor signal indicative of a traffic light and the sun is identified, wherein the sun causes a threshold level of perception degradation to the sensor system. At 706, perception degradation data is identified that includes a location of the sensor system, an orientation of the sensor system, a date, and a time of day. At 708, a position of the sun is determined relative to a spatial position indicative of the perception degradation data and a temporal position indicative of the perception degradation data. At 710, a position of the traffic light is determined relative to the spatial position indicative of the perception degradation data. At 712, a mechanical system of an autonomous vehicle is controlled to execute a maneuver that reduces perception degradation to the sensor system based upon the position of the sun, the position of the traffic light, and the perception degradation data. The methodology 700 completes at 714.

Figure 8:
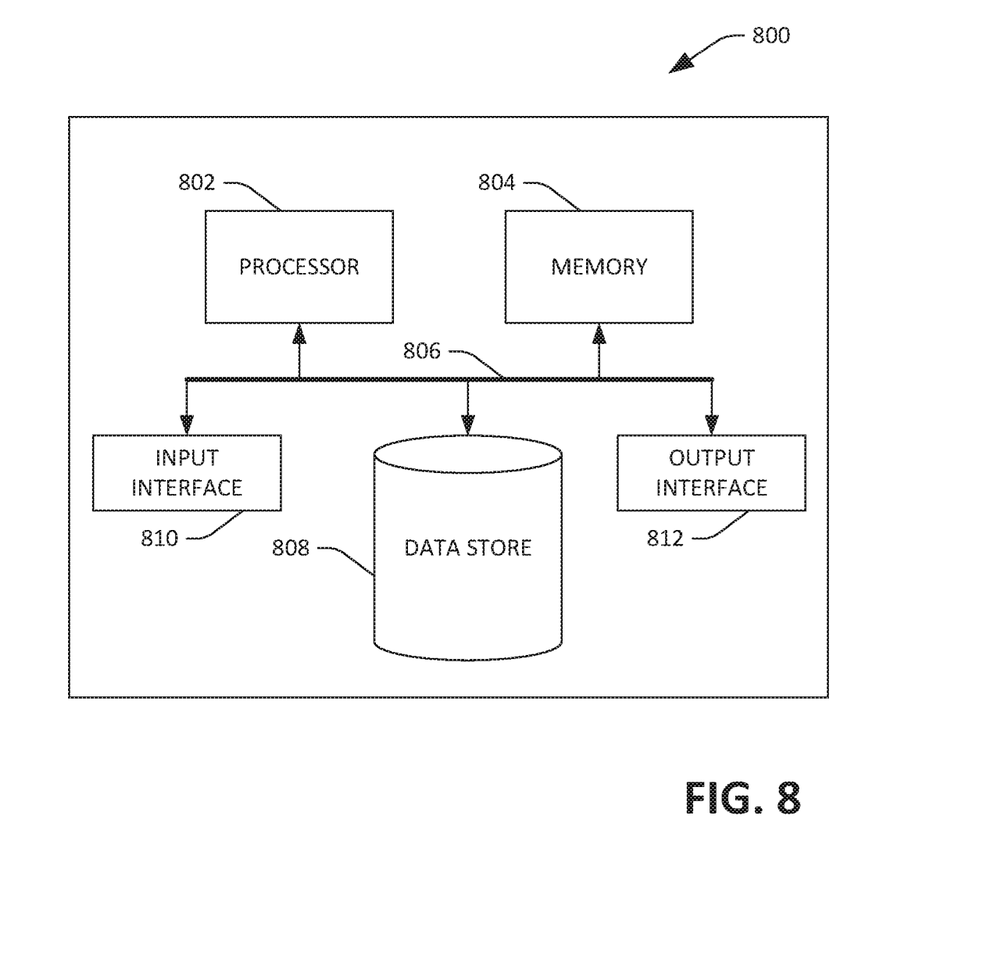
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the computing systems (112, 200). The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. In addition to storing executable instructions, the memory 804 may also store location information, distance information, direction information, etc.

The computing device 800 additionally includes a data store 808 that is accessible by the processor 802 by way of the system bus 806. The data store 808 may include executable instructions, location information, distance information, direction information, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the articulation devices 103-104, the vehicle propulsion system 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
   a mechanical system;
   a sensor system configured to generate a sensor signal indicative of a traffic light;
   an electro-mechanical device affixed to the sensor system, the electro-mechanical device configured to move the sensor system with respect to the autonomous vehicle, wherein movement of the sensor system by the electro-mechanical device causes a field of view of the sensor system to be modifiable;
   a computing system in communication with the mechanical system and the sensor system, wherein the computing system comprises:
      a processor; and
      memory that stores instructions that, when executed by the processor, cause the processor to perform acts comprising:
         generating an initial route for the autonomous vehicle, wherein the initial route comprises a potential stopping point for each traffic light along the initial route;
         for each potential stopping point along the initial route:
            identifying a location of the sensor system within an environment of the autonomous vehicle;
            identifying a maneuver to control an orientation of the sensor system at the location based on perception degradation to the sensor system; and
            determining whether the sun causes a threshold level of perception degradation to the sensor system when the sensor system generates the sensor signal indicative of the traffic light at the location, wherein the determination is based upon a date, a time of day, the location of the sensor system, and the orientation of the sensor system at the location of the sensor system within the environment of the autonomous vehicle;
         generating an updated route for the autonomous vehicle and data specifying movements of the sensor system to be effectuated by the electro-mechanical device to modify the field of view of the sensor system along the updated route such that the updated route and the movements of the sensor system to modify the field of view of the sensor system along the updated route causes the sensor system to avoid a particular potential stopping point having perception degradation to the sensor system exceeding the threshold level of perception degradation;
         controlling the mechanical system to cause the autonomous vehicle to traverse along the updated route; and
         controlling the electro-mechanical device to move the sensor system to modify the field of view based on the data specifying the movements of the sensor system as the autonomous vehicle traverses along the updated route.

2. The autonomous vehicle of claim 1, wherein the updated route is generated to preempt the perception degradation to the sensor system determined to exceed the threshold level of perception degradation.

3. The autonomous vehicle of claim 1, wherein the location of the sensor system and the orientation of the sensor system are projected for an identified route.

4. The autonomous vehicle of claim 1, wherein the perception degradation to the sensor system is determined to exceed the threshold level of perception degradation based at least in part upon a precomputed value for the location of the sensor system, wherein the precomputed value is identified according to the date and the time of day.

5. The autonomous vehicle of claim 1, wherein the perception degradation to the sensor system is determined to exceed the threshold level of perception degradation based upon a value computed by the computing system.

6. The autonomous vehicle of claim 1, wherein the perception degradation to the sensor system is based upon a proximity of a first pixel corresponding to the sun to a second pixel corresponding to the traffic light, wherein the first pixel and the second pixel are included in an image represented in the sensor signal.

7. The autonomous vehicle of claim 1, wherein the determination is further based upon information specifying whether a weather condition blocks the sun at the location of the sensor system, and wherein the information comprises at least one of a current weather condition at the location of the sensor system or weather forecast information for the location of the sensor system.

8. The autonomous vehicle of claim 1, wherein the time of day is determined according to an offset from a meridian and the date is determined according to an offset from a first day of a calendar year.

9. The autonomous vehicle of claim 1, wherein the location of the sensor system is based upon at least one of a latitude value, a longitude value, or an elevation value.

10. The autonomous vehicle of claim 1, wherein the determination is further based upon information specifying whether a weather condition blocks the sun at the location of the sensor system, and wherein the information comprises information indicating whether the weather condition is one of sunny or cloudy.

11. An autonomous vehicle comprising:
    a sensor system that generates a sensor signal;
    an electro-mechanical device affixed to the sensor system, the electro-mechanical device configured to rotate the sensor system with respect to the autonomous vehicle, wherein rotation of the sensor system by the electro-mechanical device causes a field of view towards which the sensor system is oriented to be modifiable;
    a computing system in communication with the sensor system and the electro-mechanical device, wherein the computing system comprises:
       a data store comprising:
          perception degradation data, wherein the perception degradation data specifies a level of interference caused by the sun with detection of a state of a traffic light by the sensor system at a particular location and a particular orientation within an environment for a given date and a given time of day; and
          occlusion location information for an object that occludes the sun from a perspective of the sensor system;
       a processor; and
       memory that stores instructions that, when executed by the processor, cause the processor to perform acts comprising:

receiving the sensor signal, the sensor signal being indicative of the traffic light and the sun, wherein the sensor signal is generated by the sensor system when the sensor system is at the particular location and the particular orientation within the environment at the given date and the given time of day;

receiving the perception degradation data for the particular location and the particular orientation within the environment for the given date and the given time of day;

when the sensor system is at the particular location and the particular orientation within the environment at the given date and the given time of day, determining perception degradation to the sensor system caused by the sun based at least in part on the perception degradation data, the occlusion location information, and data specifying whether the sun reflecting off a window of a building causes perception degradation at the particular location and the particular orientation; and controlling the electro-mechanical device to rotate the sensor system to modify the field of view when the perception degradation to the sensor system exceeds a threshold perception degradation, wherein the sensor system is rotated to reduce the perception degradation to the sensor system based on a position of the sun, a position of the traffic light, a position of the object that occludes the sun, and a position of the window of the building.

12. The autonomous vehicle of claim 11, further comprising:
a mechanical system, wherein the computing system is further in communication with the mechanical system;
wherein the memory further stores instructions that, when executed by the processor, cause the processor to perform acts comprising:
controlling the mechanical system to alter a location of the autonomous vehicle, wherein the location of the autonomous vehicle is altered such that the perception degradation to the sensor system is reduced.

13. The autonomous vehicle of claim 11, wherein the perception degradation to the sensor system caused by the sun is further determined based on information specifying whether a weather condition blocks the sun at the particular location.

14. The autonomous vehicle of claim 11, wherein the perception degradation data corresponds to a particular lane of a road.

15. A method of controlling an autonomous vehicle, comprising:
generating an initial route for the autonomous vehicle, wherein the initial route comprises potential stopping points for each traffic light along the initial route;
for each of the potential stopping points along the initial route:
identifying a location of a sensor system of the autonomous vehicle within an environment of the autonomous vehicle;
identifying a maneuver to control an orientation of the sensor sytem at the location based on perception degradation to the sensor system; and
determining the perception degradation to the sensor system caused by the sun when the sensor system generates a sensor signal indicative of a traffic light at the location, wherein the determination is based on a date, a time of day, the location of the sensor system, and the orientation of the sensor system at the location of the sensor system within the environment of the autonomous vehicle;

generating an updated route for the autonomous vehicle and data specifying movements of the sensor system to be effectuated by an electro-mechanical device to modify a field of view of the sensor system along the updated route such that the updated route and the movements of the sensor system to modify the field of view of the sensor system along the updated route causes the sensor system to avoid the potential stopping points having perception degradation to the sensor system exceeding a threshold level of perception degradation;

controlling a mechanical system of the autonomous vehicle to cause the autonomous vehicle to traverse along the updated route; and controlling the electro-mechanical device to move the sensor system with respect to the autonomous vehicle to modify the field of view of the sensor system based on the data specifying the movements of the sensor system as the autonomous vehicle traverses along the updated route.

16. The method of claim 15, wherein the determination is further based upon information specifying whether a weather condition blocks the sun at the location of the sensor system, and wherein the information comprises information indicating whether the weather condition is one of sunny or cloudy.

17. The method of claim 15, wherein the perception degradation to the sensor system is determined to exceed the threshold level of perception degradation based at least in part upon a precomputed value for the location of the sensor system, wherein the precomputed value is identified according to the date and the time of day.

18. The method of claim 15, wherein the updated route is generated to preempt the perception degradation to the sensor system from exceeding the threshold level of perception degradation.

19. The method of claim 15, wherein the determination is further based upon information specifying whether a weather condition blocks the sun at the location of the sensor system, and wherein the information comprises at least one of a current weather condition at the location of the sensor system or weather forecast information for the location of the sensor system.

20. The method of claim 15, wherein the determination is further based upon occlusion location information for an object that occludes the sun from a perspective of the sensor system.

* * * * *